(12) United States Patent
Dustman (10) Patent No.: US 10,042,413 B2
(45) Date of Patent: Aug. 7, 2018

(54) METHODS AND SYSTEMS FOR MULTIPLE BUS GENERATOR AND LOAD CONTROL

(71) Applicant: ASCO Power Technologies, L.P., Florham Park, NJ (US)

(72) Inventor: William J. Dustman, Clemmons, NC (US)

(73) Assignee: ASCO POWER TECHNOLOGIES, L.P., Florham Park, NJ (US)

(*) Notice: Subject to any disclaimer, the term of this patent is extended or adjusted under 35 U.S.C. 154(b) by 481 days.

(21) Appl. No.: 14/744,077

(22) Filed: Jun. 19, 2015

(65) Prior Publication Data

US 2016/0018878 A1    Jan. 21, 2016

Related U.S. Application Data

(60) Provisional application No. 62/027,085, filed on Jul. 21, 2014.

(51) Int. Cl.
    *G06F 1/32*     (2006.01)
    *G06F 13/42*    (2006.01)

(52) U.S. Cl.
    CPC .......... *G06F 1/3287* (2013.01); *G06F 1/3206* (2013.01); *G06F 13/4221* (2013.01)

(58) Field of Classification Search
    None
    See application file for complete search history.

(56) References Cited

U.S. PATENT DOCUMENTS

| | | | | |
|---|---|---|---|---|
| 5,384,697 A | * | 1/1995 | Pascucci ................. | G06F 9/465 700/10 |
| 2002/0062180 A1 | * | 5/2002 | Enberg ................... | G06Q 50/06 700/286 |
| 2004/0160199 A1 | * | 8/2004 | Morgan .................. | A01M 1/04 315/312 |
| 2007/0076340 A1 | * | 4/2007 | Ewing ...................... | G06F 1/26 361/62 |
| 2009/0006815 A1 | * | 1/2009 | Loubier ................... | G05B 9/02 712/208 |
| 2012/0049629 A1 | * | 3/2012 | Miller ..................... | H02J 3/383 307/64 |
| 2012/0063039 A1 | * | 3/2012 | Shah ...................... | H02H 7/261 361/20 |

* cited by examiner

*Primary Examiner* — Henry Tsai
*Assistant Examiner* — Christopher Bartels
(74) *Attorney, Agent, or Firm* — McDonnell Boehnen Hulbert & Berghoff LLP (57) ABSTRACT

Multiple bus generator and load control monitoring system for electrical switchgear is provided. In one arrangement, the system is designed to allow for the increased functionality of a single bus system to be used in multiple bus systems wherein the multiple buses are separated or combined together to act as a single bus. Each bus within the multiple bus system may be able to utilize increased functionality of a typical generator bus and load control system independently if separated. Separate bus structures may be separated by some sort of isolation device, for example: a circuit breaker, transfer switch, or the like. If the bus segments are connected together via isolation devices, then the combination of the overall connected bus structure will act as a single entity, while containing enhanced automation functions.

14 Claims, 4 Drawing Sheets

METHODS AND SYSTEMS FOR MULTIPLE BUS GENERATOR AND LOAD CONTROL

CROSS-REFERENCE TO RELATED APPLICATIONS

This application claims priority under Section 119(e) to U.S. Provisional Patent Application No. 62/027,085 filed Jul. 21, 2014 the content of which is entirely incorporated herein by reference.

BACKGROUND

Unless otherwise indicated herein, the materials described in this section are not prior art to the claims in this application and are not admitted to be prior art by inclusion in this section.

The present disclosure relates generally to devices and systems for power management such as power monitoring, control, and measurement, such as devices and systems that may be used to prevent power interruptions or improve power quality through the use of an operator-computer-controlled interface. For example, the present disclosure may find use in various types of power management devices such as power switchgear, Uninterruptable Power Supplies (UPSs), load banks, generators, Computer Room Air Conditioner (CRAC) units, Computer Room Air Handling (CRAH) units, parallel switchgear, substation switchgear, utility switchgear, and the like. More specifically, this patent disclosure concerns methods and systems for control of a power-quality measuring or monitoring devices comprising multiple bus structures.

Power-quality measuring and monitoring is an important concept in the power industry and generally relates to devices, methods, and systems that ensure that an alternating current (AC) power system is consistent, free from harmonic content, and/or remains uninterrupted. For example, a power-quality meter is one type of device that can give some form of harmonic content indication. Another example of a power-quality and monitoring device is a power transfer switch that is used to switch electrical loads between two independent sources of power, so as to prevent disruption in service. One goal of a power transfer-switch system is to help ensure that the electrical load is supplied with an acceptable source of power at a high rate of availability and to minimize load disruptions. Power transfer switches are in widespread use in, e.g., airports, subways, schools, hospitals, military installations, industrial sites, and commercial buildings equipped with secondary power sources and where even brief power interruptions can be costly or perhaps even life threatening.

Certain known methods and systems have been used for monitoring and controlling power systems. Such power systems may typically comprise a single engine generator bus with one or more paralleled engine generators operatively coupled to this single bus structure. An isolation device, such as an electric circuit breaker, an automatic transfer switch, or the like may be used to operatively couple the engine generator to the single bus. In this configuration, a monitoring system controller may be used to control the operation of the two generators, the isolation device, and the various types of different loads that are connected to the bus. Such a monitoring system controller operates so as to efficiently and economically run the generators and connect and disconnect the loads, when required. In such a single bus and parallel engine generator configuration, various control features may be used to operate the engine generators and loads during certain events. Such control features may include such features as automatic generator starting, block loading, load prioritization, under frequency conditions, bus optimization, bus overload, load demand, load control of disconnect devices, load Hand-Off-Auto, and no load system tests.

If, however, the engine generators could be paralleled together on separate buses, where each separate bus comprises two or more paralleled generators, the automated system utilized in a single bus system as described above presents certain limitations. As just one example, such an automated system may not be configured or operable so as to provide certain of the various operation and control features as noted above. As such, there is a general need for a more efficient method and system for controlling a power monitoring system comprising a plurality of parallel generator sets used on a plurality of separate busses wherein the busses are operatively coupled to a plurality of different prioritized loads.

SUMMARY

In one example aspect, a multiple bus generator and load control monitoring system for electrical switchgear is provided. In one arrangement, the system is designed to allow for the increased functionality of a single bus system to be used in multiple bus systems wherein the multiple buses are separated or combined together to act as a single bus. As Applicants explain, each bus within the multiple bus system may be able to utilize increased functionality of a typical generator bus and load control system independently if separated. As just one example, separate bus structures may be separated by some sort of isolation device, for example: a circuit breaker, transfer switch, or the like. If the bus segments are connected together via isolation devices, then the combination of the overall connected bus structure will act as a single entity, while containing enhanced automation functions.

In one exemplary aspect, a bus and load monitoring and control system comprises a first bus system for providing power to a first plurality of loads, the first bus system comprising: a first engine generator for providing emergency power to a first bus; a first isolation device operatively connecting the first engine generator to the first bus; and a first plurality of loads coupled to the first bus. The system further comprises a second bus system for providing power to a second plurality of loads, the second bus system comprising: a first engine generator for providing emergency power to a second bus; a first isolation device operatively connecting the first engine generator to the second bus. A third isolation device connects the first bus system to the second bus system. A monitoring system controller for monitoring and controlling operation of the first and the second bus systems, the monitoring system controller performing the steps of: receiving information from the first bus system; injecting the first bus information into a core code; running the first bus information through the core code; receiving information from the second bus system; injecting second bus information into the core code; running the second bus information through the core code; increasing an index value; running a program loop; taking first bus information and second bus information from the core code and organizing this information into an array; wherein the system controller determines whether to change an operating parameter of the system based on the first and second bus information.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
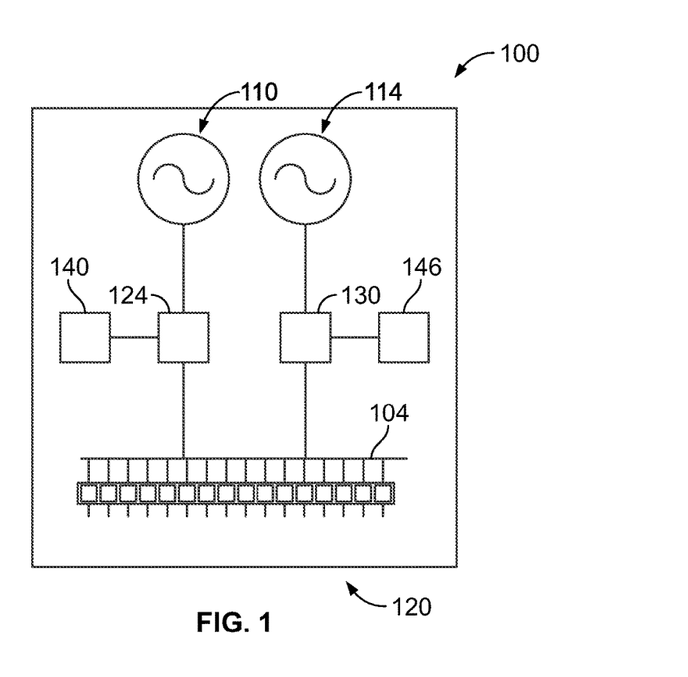
FIG. 1 is an illustration of a typical single bus system.

FIG. 1 is an illustration of an example power management system 100 in which the proposed methods and systems can be implemented. In this illustrated arrangement, the power management system comprises a transfer switch power management system. However, it should be understood, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a transfer-switch controller, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure. Yet still further, although a transfer switch system is illustrated, alternative power management systems may also utilize the various features discussed and described in this disclosure.

FIG. 1 is an illustration of a power management system 100 comprising a single bus arrangement as this power management system comprises only one bus 104. As illustrated, this bus and load control system 100 comprises a first bus system for providing power to a first plurality of loads 120 operatively coupled to a single bus 104. The first bus system 100 further comprises a first and a second engine generators 110, 114 for providing emergency power to a first bus 104. A first isolation device 124 is provided. This isolation device 124 is operatively connected between the first engine generator 110 and the first bus 104. Similarly, a second isolation device 130 is operatively connected between the second engine generator 114 and the first bus 104. As such, the first and second engine generators 110, 114 are capable of being coupled in parallel to the bus 104.

As illustrated, the first isolation device 124 may comprise an electronic circuit breaker. Alternatively, this first isolation device 124 may comprise an automatic transfer switch comprising an automatic transfer switch controller 140. Similarly, the second isolation device 130 may comprise an electronic circuit breaker. Alternatively, this second isolation device 146 may also comprise an automatic transfer switch comprising an automatic transfer switch controller 146.

Figure 2:
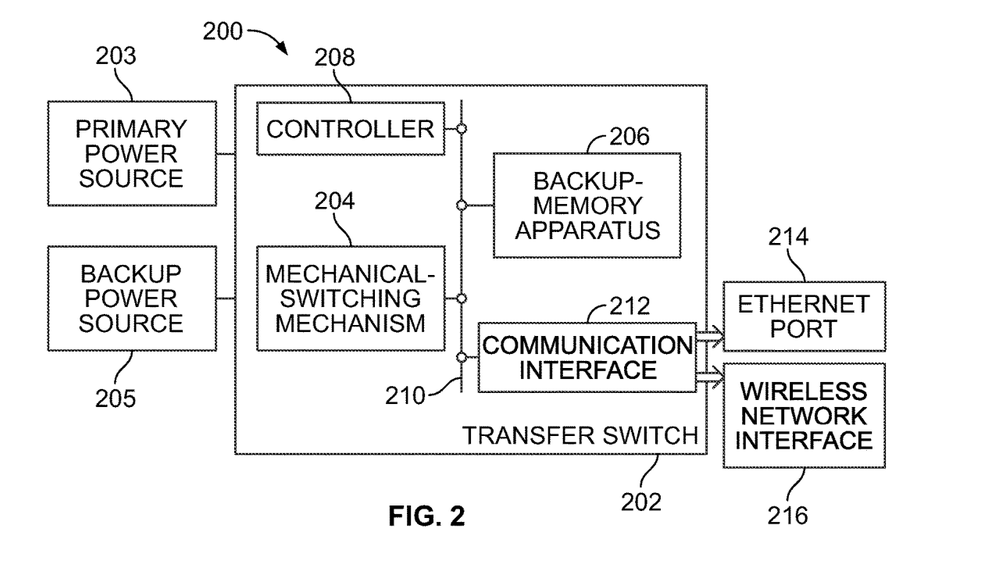
FIG. 2 is an illustration of a block diagram of an exemplary isolation device that may be used in the single bus system illustrated in FIG. 1.

FIG. 2 illustrates a block diagram of an automatic transfer switch configuration, such as the automatic transfer switches 124, 130 illustrated in FIG. 1. In this illustrated arrangement, the power management system 100 illustrated in FIG. 1 comprises a transfer switch system. However, it should be understood, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a transfer-switch controller, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure. Yet still further, although a transfer switch system is illustrated, alternative power management systems may also utilize the various features discussed and described in this disclosure.

The transfer-switch system 200 illustrated in FIG. 2 includes a transfer switch 202 that, for example, functions as a switch between a primary power source 203 (not illustrated in FIG. 1) and a backup, standby power source 205 (such as the engine generators 110, 114 illustrated in FIG. 1). The transfer switch 202 includes a mechanical-switching mechanism 204. The mechanical-switching mechanism 204 may be configured to operate automatically or manually or a combination of automatic and manual operation. The switch mode of the mechanical-switching mechanism 204 may be Open Transition (OT) or Closed Transition (CT).

The transfer switch 202 also includes a backup-memory apparatus 206 and a transfer-switch control unit such as transfer-switch controller 208. The mechanical-switching mechanism 204, the memory apparatus 206 and the transfer-switch controller 208 may be coupled together by a system bus or other mechanism 210. In an example alternative mechanism, a wireless data channel may also be provided.

In addition, the transfer-switch system 200 may also comprise communication interface drivers 212. The one or more communication interface drivers 212 may facilitate communication between components of the system 200, communication between the system 200 and one or more devices of a system control center, and/or communication with one or more external parties. For instance, the system 200 may communicate using a Modbus driver or a controller area network (CAN) bus driver, or other communication interface driver. Other communication interface drivers may also provide for communication using Modbus Ethernet, CANOpen, wired or wireless Ethernet, DeviceNet, Profi-Bus, BACNet, ARCNet, ZigBee, Bluetooth, Wi-Fi, and other similar protocol structures.

In one preferred arrangement, as will be discussed with respect to the power monitoring system 300 illustrated in FIG. 3, the communication interface 212 of the system 200 is configured to communicate with a monitoring system controller that controls the various operating parameters of an interconnected, multi-bus power system. Such an interconnected, multi-bus power system may comprise two or more of bus systems, similar in configuration to the first bus system illustrated in FIG. 1.

Figure 3:
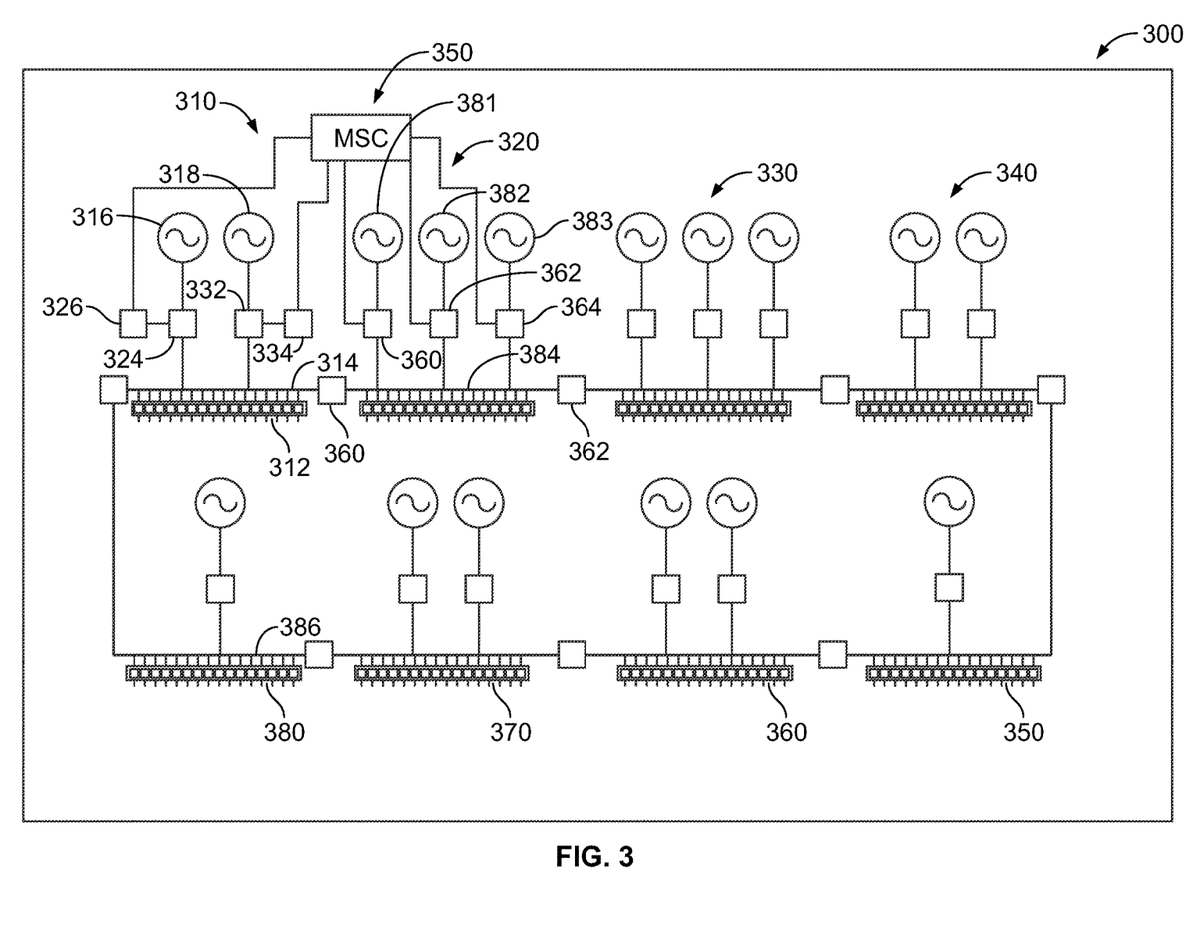
FIG. 3 is an illustration of an example multiple bus generator and load system, according to an example embodiment.

Importantly, the communication interface drivers 212 are configured to allow the transfer switch to communicate with a master bus and load controller, such as the monitoring system controller 150 illustrated in FIG. 3. In one preferred arrangement, and as will be explained in greater detail herein, such a monitoring system controller 350 can be configured to operate and control a plurality of interconnected bus and load systems, such as a plurality of the power monitoring system 100 illustrated in FIG. 1 all interconnected into a larger power monitoring system. As just a few examples, the monitoring system controller allows for system operation so as to monitor and control power for a plurality of transfer switches, paralleling control switchgear, generator sets, breakers, bus bars, and other related equipment, all interconnected via a plurality of busses within a single power management system. In addition, such a monitoring system controller 350 can monitor both normal and emergency voltages and frequency and their settings, know transfer and re-transfer loads for load sharing, bus optimization and other related system testing.

Returning to FIG. 2, the transfer switch controller 208 may be configured to provide an indication of data that is received by the primary or secondary power sources 203, 205 to one or more subscribing parties based on subscription information for the subscribing parties that is stored in a database of the memory 206 and accessible by the controller 208. In one example, subscription information for a given subscribing party may include one or more of an identification of the subscribing party, a communication type (e.g., Ethernet, wireless via Wi-Fi cloud service, etc.), and a notification frequency (e.g., how often to provide data to the subscribing party).

In one instance, based on subscription information for a subscribing party, the controller may be configured to provide an indication of data that is received by the primary or secondary power sources 203, 205 to a subscribing party via an Ethernet port 214. For instance, the Ethernet port may facilitate local management system interfacing via BACNet or Profinet protocols.

In another instance, based on subscription information for a subscribing party, the controller may be configured to provide an indication of data that is received by the controller 208 to the subscribing party via a wireless network controller 216. For example, the wireless network interface controller 216 may be coupled to a server in a network via a wireless access point. In one instance, the wireless access point may include a wireless router that is coupled to a wired network (e.g., the Internet), or the wireless access point may be configured to connect to a wireless router. The wireless network interface controller 216 may utilize any type of wireless protocol such as Wi-Fi, Wireless Application Protocol (WAP), Bluetooth, etc. In another instance, the wireless network interface controller 216 may include a wireless modem which utilizes a cellular communication system to communicate with a wired network. For example, the wireless modem may be configured to communicate using GPRS, UMTS, HSPA, EVDO, WiMax, LTE, or other cellular communication protocols.

The transfer-switch system 200 or at least one component of the transfer-switch system 200 may be configured to carry out various functions of the disclosed methods. For example, transfer-switch controller 208 may be configured to carry out various functions of the disclosed methods. One of many possible embodiments will be described, however, this embodiment, which is specific to a transfer-switch controller, shall by no means be construed as limiting the many possible variations in design of each of the components of the disclosure.

Returning to the system illustrated in FIG. 1, one advantage of such a typical bus configuration is that it allows a system controller, to control the first and second engine generators 110, 114 along with the various loads 120 coupled to this single bus 104 to perform certain operating features; including at least the following functions:

Automatic Generator Starting on Engine Start Signal from a Supported Device (Typically an Automatic Transfer Switch).

For example, when an individual engine generator control switches are placed into an automatic position, the engine generator system is on standby in readiness for automatic starting and synchronization in the event of a power failure signal.

For example, with respect to FIG. 1, in the event of a power failure, the first and second engine generators 110, 114 automatically start and come up to speed. In one typical scenario, the first generator set 110 to achieve a certain predetermined percent of nominal voltage and frequency (such as 90% of nominal voltage and frequency) may be connected to the bus 104. Electronic interlocks permit the connection of only one engine generator to the dead generator bus in the event of simultaneous generator relay operation. Upon sensing the availability of emergency power, a high priority load block (e.g., a priority-1 load block and perhaps a sub-set of loads 120) can be allowed to transfer their loads to the emergency bus. Such transfer may occur by way of a "permissive signal" to the automatic transfer switches (if equipped).

If priority 1 loads are not calling for an engine start because they have not lost normal power, a priority-pass along feature can be activated. Generally, if no loads in any priority block are calling for an engine start, all loads in lower priority blocks (e.g., another different sub-set of loads 104) can be shifted up to a higher priority for block load add/shed purposes.) A frequency synchronizer can be used to automatically adjust the frequency of the second on-coming generator set 114 so as to synchronize with the bus 104. When synchronism is achieved, the on-coming generator 114 is paralleled to the bus 104. When the second generator's disconnect 130 is closed, the priority-2 load block will be allowed to transfer their loads to the emergency bus. As each generator parallels to the bus, another block of load is allowed to add, until all generators and all loads are online.

Upon sensing that normal utility power has been restored to acceptable limits, a sequence can begin to transfer the load back to the utility source. The re-transfer shall be initiated after the retransfer to utility time delay has expired (adjustable at each ATS from 0 minute to 30 minutes) allowing an open or closed transition transfer return to utility. After all the transfer switches have re-transferred their loads to the normal source, the generator circuit breakers are simultaneously opened and the engine generators run for an adjustable no-load cool-down period of zero to thirty minutes; factory set at 5-minutes. The controls are released and the generators placed in readiness for the next power failure.

Block Loading

Preferably, in the monitoring system 100 illustrated in FIG. 1, each load connected to bus 104 has an adjustable priority setting, an estimated KW value, and step time delay associated with it. As each block of load 120 is allowed to transfer to emergency power, the individual loads will begin their step time delay. As the time delay for each load completes, the load will receive a permissive signal to transfer to emergency power. If no delay is desired, the individual step times can be set to zero seconds, and the loads will transfer immediately when the load block is permitted to transfer to emergency.

In one arrangement, if a generator fails while operating in the automatic mode, it will be disconnected from the bus and shutdown. Audible and visual alarms may be activated to indicate the condition. System loads will not shed unless a bus overload or a bus under frequency occurs.

A human interface device such as a push-button can be used to permit an override of the load-shed circuits for supervised operation (one for each priority except priority 1). Loads that have been block shed can be manually re-added using the priority-# Load Shed Bypass/Reset push-button located on the Master control section. By pressing the Load Shed Bypass/Reset push-button, the system will transfer the selected load block to the emergency bus. By pressing the Load Shed Bypass/Reset push-button a second time, the ENTIRE selected load block will shed. Indicating lights will annunciate the status of each Priority load block, indicating if it is shed or manually bypassed. If the operator inadvertently bypasses the load shed and overloads the generator(s) resulting in a bus under-frequency, manually bypassed loads can be automatically shed along with blocks of load such that the remaining load blocks shall be one less than the number of generators remaining on the bus. A "Bus Under Frequency" annunciator light can be used to indicate this condition.

In one preferred arrangement, if the online load exceeds 105% of rated generator capacity, unsupported loads (loads in priority blocks greater than the number of generators online) will be step shed in reverse priority at one second intervals. No loads in priority blocks equal to or less than the number of generators online will be shed. As just one example, if there are two generators online, load blocks 1 and 2 will stay online, while priority 3 and above will be shed. A Bus Overload light will light to indicate that the bus is overloaded automatically reset as the overload is corrected. When the online load no longer exceeds 105% of the generator capacity, step shedding will cease, and the system can continue to power the loads that are left online. Indicating lights can be used to annunciate the status of each Priority load block, indicating if any loads in that block are shed or if the load block is manually bypassed. If the operator bypasses the load shed to bring those shed loads back online, and the online load exceeds 105% of capacity again, the system will again step shed loads in reverse priority until the load no longer exceeds 105% of capacity. This is done in an attempt to prevent an under frequency situation, thereby preventing the entire load block from being shed.

Load Priority Pass-Along

This feature of a power monitoring system provides that if loads of a particular priority are not calling for backup power from the controlled source, loads of the next lower priority are moved up in to their place in order to be fed power.

Under Frequency Load Shed

With this system feature, during an under frequency condition on a bus, loads may be shed so as to avoid generator or system overload.

Bus Optimization

As noted previously, each load may be programmed with a load priority value. Such a load priority value may be field adjustable. For example, in one preferred arrangement, a load's priority value may comprise a 3-digit number. The most significant digit may be designated to refer to the load's block priority value (i.e. 201=>priority 2 load block, whereas 118=>priority 1 load block). The two lower significant digits may be configured to refer to the load's sub-priority value, or load step priority (i.e. 201=>priority 2 block, step 1; and 118=>priority 1 block, step 18). Valid priority values are 1-10 while valid sub-priority values are 1-99. Therefore, valid three digit priority values could be designated as 101-1099.

If it is determined that the load can be added without exceeding the Bus Optimization KW de-rating value, the load is signaled to add. The real time kW output of the generator bus is constantly measured and the next sub-priority load is evaluated. Loads may be evaluated at a preset time interval defined via the OIT (Bus Opt Step Time). When the bus has been loaded to a level such that the next load would exceed the de-rating value, the Next Load Exceeds Headroom light will activate and load adding will pause. The system can continuously monitor the generator load and evaluate if the next load step can fit on the bus. If building load decreases and the next load can fit (for the duration of the step time delay), the system can add it and continue the evaluation process until as many loads as possible are added to the bus.

If at any time, the online load exceeds 105% of available rated capacity, the system can be configured to remove the last load that was added. If the online load does not decrease to less than 105% of rated capacity, loads can be shed one at a time, every second in reverse order until the overload is corrected or until the number of load blocks online equals the number of generators online. Load blocks with associated generators online will not be shed. A Bus Overload light can be used to light so as to indicate that the bus is overloaded automatically reset as the overload is corrected. In this event, the system can begin at a predetermined time period (e.g., a 30 second time period) overload stabilization delay time (fixed) before evaluating additional load to be added to the bus.

If a generator fails, typically, it will be removed from the bus. If the remaining loads online exceed 105% of the remaining online generator capacity, the loads will step shed as described in the previously described. Alternatively, if the load does not exceed the online capacity, no loads will shed. In such a situation, a Bus Overload light can be used to indicate that the bus is overloaded automatically reset as the overload is corrected.

In the event of a bus under-frequency, optimized loads may be shed as well as any additional unsupported blocks of load. Load blocks may be shed such that the remaining load blocks shall be one less than the number of generators remaining on the bus. A "bus under frequency" annunciator light can be used to indicate this condition.

In one preferred arrangement, no loads can be manually added while a bus under frequency alarm indication is active. The operator must acknowledge the alarm by pressing the Alarm Reset pushbutton (provided bus under frequency is still not active). After the operator acknowledges the alarm, the system will again be block loaded. Each priority block for which there is a generator online will be added to the system, one load block per generator online. While the load block is adding to the bus, if bus optimization is enabled, the bus optimization will start adding loads after a bus optimization start time delay and in the same manner as described previously for bus optimization in the preceding paragraphs.

If a load block is manually bypassed, all loads in that block will add, subject to their individual step timers. If they were already optimized on, they will remain on. If the load block is then manually shed, all loads in that load block will shed.

Once all loads in a priority load block have been added to the bus, the LOAD SHED light for the associated priority will turn off.

Bus Overload Load Step Shed

This is the situation where if the bus becomes overloaded, loads will be step or block shed depending on the severity of the overload condition to avoid loss of power to critical loads.

Load Demand (Generator Priority Cycling Based on Engine Runtime)

The load demand logic controls the number of generator sets to remove excess generator capacity when needed, thereby keeping load demand functions to reduce the number of online generator sets if reserve capacity allows for a reduced number of sets to still power all loads requiring generator power. Generally, the power control system may be designed to allow the minimum number of engine generators to support the load to increase fuel and generator efficiency. Generators will be added or removed from the bus system depending on system load.

Load Control (Circuit Breakers or Automatic Transfer Switch)

The power monitoring system controls the adding and/or removing of system loads to the system automatically base on loading schemes such as block load controls, bus optimization, bus under frequency load shed, and bus overload load shed.

Load HOA [Hand-Off-Auto]

In one preferred system, individual loads in the system may be manually added or removed from emergency (or backup generator) power. This is a manual operation by the operator of the system. There are three positions, HAND— which means add, OFF— which means shed the load, and AUTO—which means let the system automation decide whether to power the load or not.

No Load System Test

With this test procedure, the generator can be automatically run and connected in parallel. No system load is connected. This is for system testing purposes.

FIG. 3 illustrates a multiple bus generator and load control automated system 300 for electrical switchgear. This multiple bus generator and load control automated system is operated under the control of a monitoring system controller 350 and is designed to allow the full functionality of typical single bus systems to be used in multiple bus systems when the multiple buses are separated or combined together to act as a single bus. As configured, each bus is able to utilize the full functionality of a typical generator bus and load control system independently if separated (typically by some sort of isolation device, for example: a circuit breaker or an automatic transfer switch). If any of the bus segments of the various bus systems are connected together via isolation devices, then the combination of that bus will act as a single entity, still containing all of the automation functions as identified above.

As illustrated, FIG. 3 provides an illustration of a power management system 300 comprising a bus arrangement comprising a plurality of interconnected bus systems 310, 320, 330, 340, 350, 360, 370, and 380. Specifically, this power management system 300 comprises a first bus system 310 for providing power to a first plurality of loads 312. These loads 312 are operatively coupled to a single bus 314. The first bus system 300 further comprises first and second engine generators 316, 318 for providing emergency power to the first bus 314. Of course, those of ordinary skill in the art will recognize alternative interconnected bus systems having more or less bus systems and having different generator set configurations may also be used.

A first isolation device 324 is operatively connected between the first engine generator 316 and the first bus 314. Similarly, a second isolation device 332 is operatively connected between the second engine generator 318 and the first bus 314. As such, the first and second engine generators 316, 318 are capable of being coupled in parallel to the first bus 314.

Figure 4:
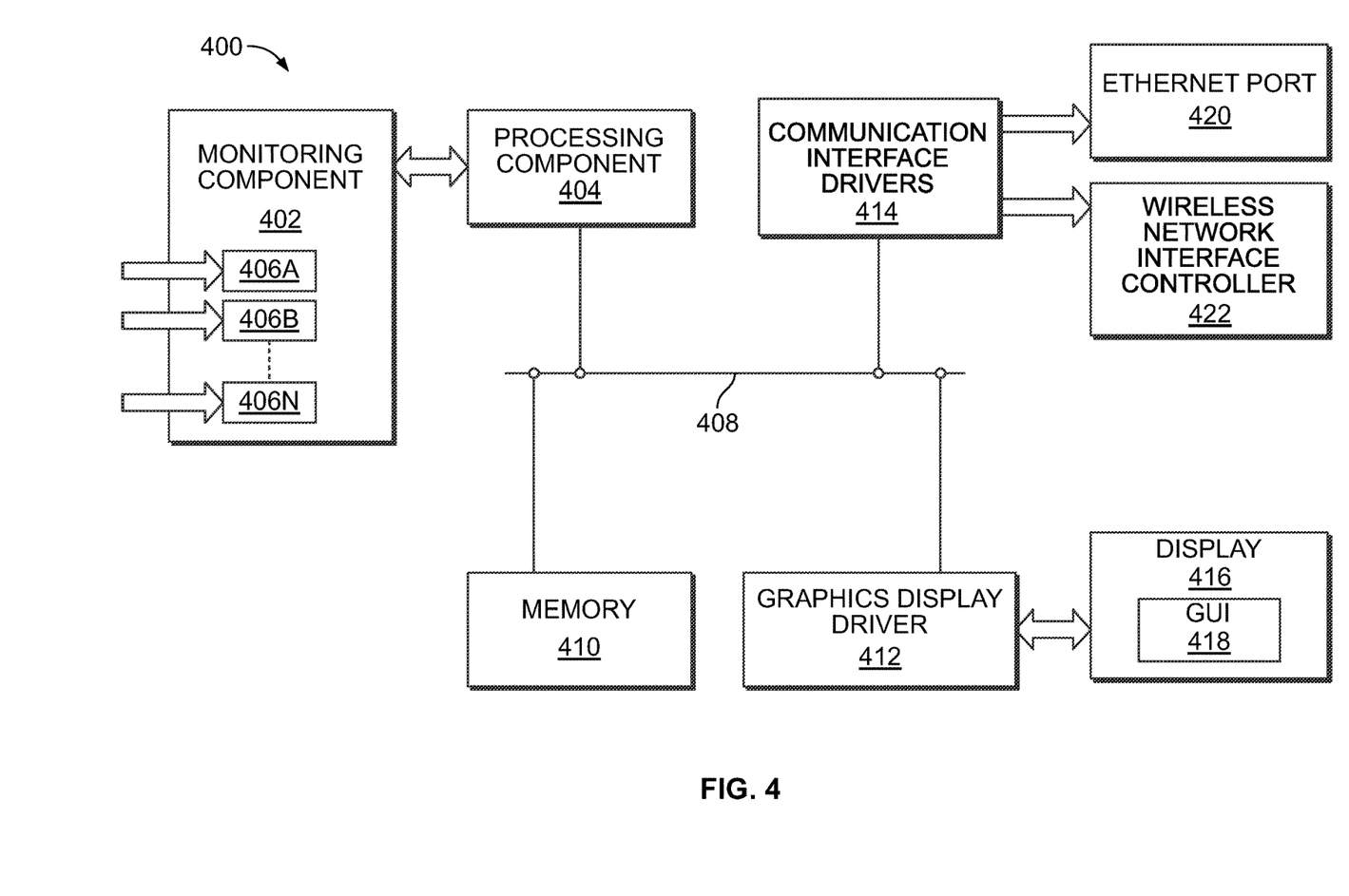
FIG. 4 is an illustration of a block diagram of an exemplary monitoring system controller that may be used in the multiple bus generator and load system illustrated in FIG. 3.

As illustrated, the various other interconnected bus systems 310, 320, 330, 340, 350, 360, 370, and 380 illustrated in FIG. 4 are interconnected by disconnect devices. As just one example, the first bus system 310 is interconnected to the second bus system 320 by way of a third disconnect device 360. Such a third disconnect device may comprise a circuit breaker, an automatic transfer switch, or other similar device. In a similar arrangement, the second bus system 320 is interconnected by a disconnect device 362 with the third bus system 330. As illustrated, the remaining bus systems 330, 340, 380, 370, 360, and 350 are also interconnected to adjacent buss systems in a similar fashion.

FIG. 2 illustrates a block diagram of an automatic transfer switch configuration, such as the automatic transfer switches 324, 332 illustrated in FIG. 3. In this illustrated arrangement, the power management system 300 illustrated in FIG. 3 comprises a first bus system 310 comprising a transfer switch system. However, it should be understood, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a transfer-switch controller, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure. Yet still further, although a transfer switch system is illustrated, alternative power management systems may also utilize the various features discussed and described in this disclosure.

As just one example, the second bus system 320 may comprise a circuit breaker and a transfers switch arrangement. For example, and as illustrated, the second bus comprises three generators 381, 382, and 383 and three disconnect devices 360, 362, and 364. As discussed herein, these disconnect devices may all comprise circuit breakers, may all comprise automatic transfer switches, or may comprise a combination of these types of disconnect devices or other similar devices.

As also illustrated in FIG. 3, the first and second disconnect devices 324, 332 each comprise a disconnect controller. For example, disconnect device 324 comprises a disconnect controller 326 and disconnect device 332 comprises a disconnect controller 334. Where the disconnect devices 324, 332 comprise automatic transfer switches, such disconnect controllers comprise automatic transfer switch controller as illustrated in FIG. 2. In this configuration, both disconnect controllers 326, 334 are operably coupled to a monitoring system controller 350. Such a monitoring system controller 350 may be a system controller as illustrated in FIG. 4.

For example, FIG. 4 is a block diagram illustrating an example monitoring system controller 400 that may be used to monitor a system comprising one or more bus systems, such as the interconnected bus system 300 illustrated in FIG. 3. In some examples, the monitoring system controller 400 may include one or more functional or physical components, such as a processing component 402 and a monitoring component 404. One or more of the described functional or physical components may be divided into additional functional or physical components, or combined into fewer functional or physical components. Additionally, the system 400 may include more or less functional and/or physical components.

The monitoring component 402 may be a communication interface that is configured to receive data from multiple bus systems via multiple input ports 406A-406N. As just one example, and referring to FIG. 3, the first input port 406A of the communication interface may be configured to receive data from the first bus system 310, and the second input port 406B may be configured to receive data from the second bus system 320. The remaining input ports 406D-406N of the communication interface may be configured to receive data from the remaining bus systems in a similar fashion.

The input ports 406A-406N may include one or any combination of serial communication ports and parallel communication ports. For instance, any of the input ports 406A-406N may include any type of Modbus serial communication port (e.g., Modbus RS485) or Modbus over Ethernet port.

The processing component 404 may be configured to receive electrical signals from the monitoring component 402. Functions of the processing component 404 may be performed by any type of processor such as a microprocessor, microcontroller, digital signal processor, or any combination thereof. Additionally, the processing component 404 may include one or more levels of caching, a processor core, and registers. The processor core can include an arithmetic logic unit, a floating point unit, a digital signal processing core, or any combination thereof. In some examples, the functions of the processing component 404 may be provided by multiple microprocessors.

The processing component 404 may be coupled to additional components of the system 400 via a connection mechanism 408. In one example, the connection mechanism may be a computing bus. The computing bus may include any type of subsystem configured to transfer data between components. In another example, the connection mechanism 408 may be an electronic circuit board. For instance, the processing component 404 may be connected to an electronic circuit board that other components of the system 400 are also connected to. Optionally, the electronic circuit board may further be connected to an input/output (I/O) expansion board. For instance, a ribbon cable may connect the electronic circuit board to the I/O expansion board.

In one example configuration, the processing component may be coupled to a memory 410, a graphics display driver 412, and one or more communication interface drivers 414. The memory 410 may include any type of memory such as for example, volatile memory (e.g., random access memory), non-volatile memory (e.g., read only memory, flash memory, etc.) or any combination thereof. The memory 410 may include stored software applications and/or databases, and the processing component 404 or other components of the system 400 may be configured to access the memory 410 and execute one or more of the software applications stored therein or read/write data of the databases stored therein. In one example, the memory 410 may store a subscription database having subscription information for one or more subscribing parties.

The graphics display driver 412 may be configured to drive a display 416 of the system 400 or an external display for a PC, laptop, video monitor, television, or similar monitor device. Such displays may be provided locally at a location of the system 400 or remotely. In one instance, the display 416 may be configured to provide a graphical user interface 418. The graphical user interface 418 may be configured to receive various user inputs. For instance, a user may utilize the graphical user interface 418 to add an interconnected bus system to be monitored by the system 400, modify a configuration of a bus system that is being monitored, name a Modbus register, modify a preferred Modbus register list, or perform other functions.

The one or more communication interface drivers 414 may facilitate communication between components of the system 400, communication between the system 400 and one or more devices of the monitoring system 300, and/or communication with one or more external parties. For instance, the system 400 may communicate using a Modbus driver or a controller area network (CAN) bus driver, or other communication interface driver. Other communication interface drivers may also provide for communication using Modbus Ethernet, CANOpen, wired or wireless Ethernet, DeviceNet, ProfiBus, BACNet, ARCNet, ZigBee, Bluetooth, Wi-Fi, and other similar protocol structures.

In one example, the processing component 404 may be configured to provide an indication of data that is received by the monitoring component 402 to one or more subscribing parties based on subscription information for the subscribing parties that is stored in a database of the memory 410 and accessible by the processing component 404. In one example, subscription information for a given subscribing party may include one or more of an identification of the subscribing party, a communication type (e.g., Ethernet, wireless via Wi-Fi cloud service, etc.), and a notification frequency (e.g., how often to provide data to the subscribing party).

In one instance, based on subscription information for a subscribing party, the processing component may be configured to provide an indication of data that is received by the monitoring component 402 to the subscribing party via an Ethernet port 420. For instance, the Ethernet port may facilitate local building management system interfacing via BACNet or Profinet protocols.

In another instance, based on subscription information for a subscribing party, the processing component may be configured to provide an indication of data that is received by the monitoring component 402 to the subscribing party via a wireless network controller 422. For example, the wireless network interface controller 422 may be coupled to a server in a network via a wireless access point. In one instance, the wireless access point may include a wireless router that is coupled to a wired network (e.g., the Internet), or the wireless access point may be configured to connect to a wireless router. The wireless network interface controller 422 may utilize any type of wireless protocol such as Wi-Fi, Wireless Application Protocol (WAP), Bluetooth, etc. In another instance, the wireless network interface controller 422 may include a wireless modem which utilizes a cellular communication system to communicate with a wired network. For example, the wireless modem may be configured to communicate using GPRS, UMTS, HSPA, EVDO, WiMax, LTE, or other cellular communication protocols.

As described above, the monitoring system controller illustrated in FIG. 4 may comprise a memory 410 that may include stored software applications and/or databases. As such, the processing component 404 or other components of the system 400 may be configured to access the memory 410 and execute one or more of the software applications stored therein or read/write data of the databases stored therein. As just one example, such stored software applications and/or databases may comprise electrical switchgear code that allows the various operating parameters discussed and explained above to work on all separated buses or combined buses. For example, the presently discussed system and method as illustrated in FIG. 3 under operation of the monitoring system controller 400 works by creating a shell of a program. Preferably, this program is stored on a monitoring system controller, such as the monitoring system controller 350 illustrated in FIG. 3.

In one arrangement, this power monitoring system program is configured to mimic the program of a single bus system, such as the single bus system 100 illustrated in FIG. 1. For example, referring to the monitoring system illustrated in FIG. 3, bus information for the first bus system (such as first bus system 310 of FIG. 3) is injected into a core code. This information is then run through the code. Next, bus information from a second bus system (such as second bus system 320 in FIG. 3) is injected into the core code and run. Thereafter, the code runs through each other interconnected bus system (such as bus systems 330, 340, 350, 360, 370, and 380) are also run through the code. Preferably, each time by increasing an index value and running the core code (programming loops). At the end of each loop, bus information is taken out and organized into arrays.

If buses are connected together via isolation devices as illustrated in FIG. 3, when the core code for any bus is run, it is fed information for all other connected devices. All connected buses then agree on the information from all interconnected buses, as they ran through the same core code. The decision making for connected buses comes from the highest number bus of the connections. All of these decisions affect the combination of buses and the buses will act as one bus now when combined. Recently connected or disconnected buses are examined to determine which mode the new buses need to be in. The system 300 under operation and control by the monitoring system controller 350 also determines if any generators need to be started or stopped and if any load needs to be added or shed.

Example Method of Load Control

Figure 5:
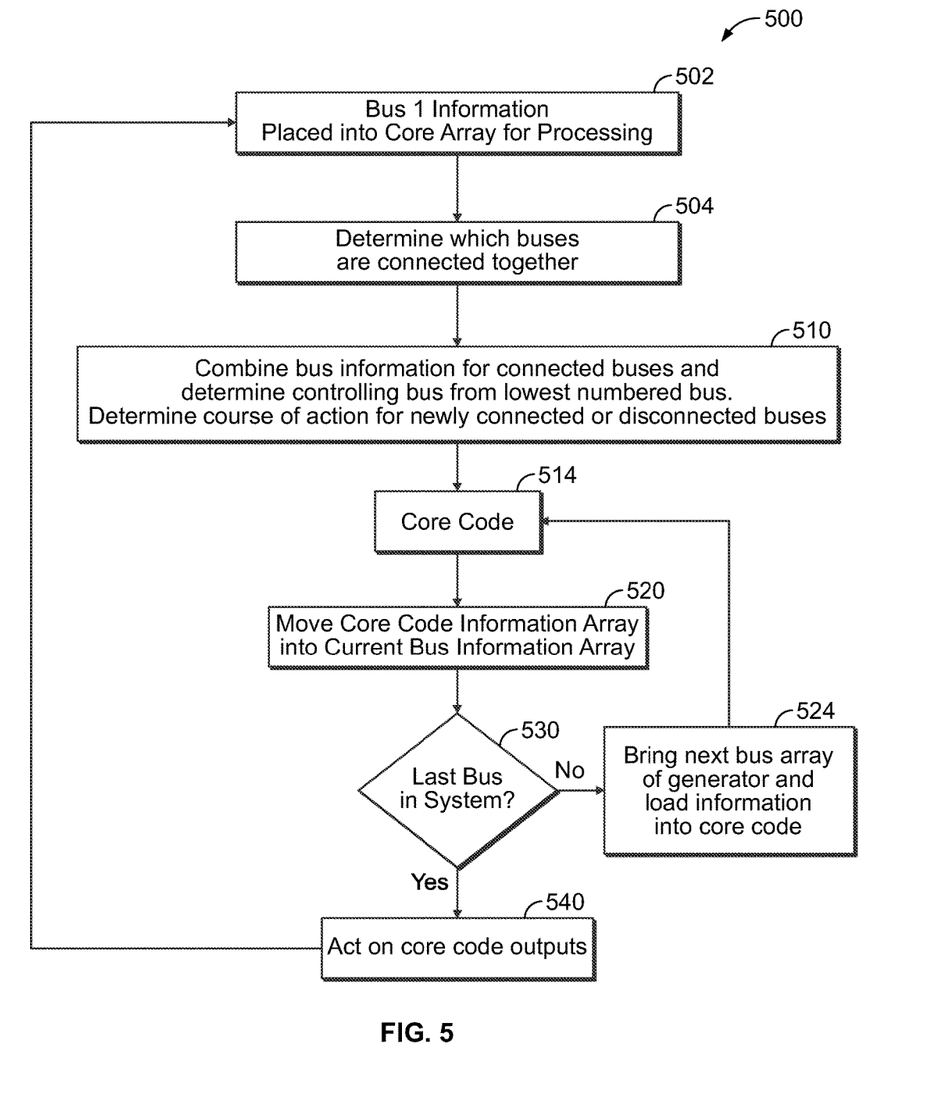
FIG. 5 is an illustration of an example flow chart illustrating an example method, according to an example embodiment of the present disclosure.

FIG. 5 shows a flow chart 500 of the operation of the code module. Referring now to step 502, loads and generators are each assigned to buses. For example, referring back to FIG. 3, the loads 312 and first and second generators 316, 318 are assigned to bus number 1 (bus 314). In one arrangement, these assignments may be changed during a run-time of the code. This can allow the switching of loads and/or generators to other buses. Preferably, the monitoring system controller 350 will be configured to re-adjust for any generator or load being added or removed from a bus through the bus assignment number or closing/opening of a bus isolation device.

Next, at step 504, the monitoring system controller 350 determines which bus system are connected together. As just one example, in FIG. 3, the monitoring system controller 350 would determine that the first bus 314 is connected to the second bus 384 of the second bus system 320 and also to the fifth bus 386 of the fifth bus system 380. Completing this interconnected bus system network, the monitoring system controller 350 would determine the interconnected nature of all eight bus systems in FIG. 3. Then, at step 510, the information of all eight interconnected busses is combines and the monitoring system controller determines which of the plurality of interconnected busses will be designated as a controlling bus. Preferably, this is determined from the lowest connected bus. For example, as illustrated in FIG. 3, bus 1 of the first bus system would be determined to be the controlling bus as it is the lowest connected bus.

One advantage of the presently disclosed system and method of power monitoring is that certain limitations noted above with the single bus system are now longer present. As such, various monitoring features may now be used with enhanced bus structures comprising enhanced system monitoring features include at least the following:

Block Loading—Loading of an electrical switchgear bus by allowing 1 or more loads (typically more than 1) to be added to the bus by a single permissive signal. Each load may or may not be accompanied by a time delay after that permissive signal. The basic premise is that multiple loads could add at the same time and generally do under block loading.

Load Priority Pass-Along—This is a feature of a system where-as if loads of a particular priority are not calling for backup power from the controlled source, loads of the next lower priority are moved up in to their place in order to be fed.

Under Frequency Load Shed—During an under frequency condition on a bus, loads may be shed to avoid generator or system overload.

Bus Optimization—This feature works in conjunction with block loading to add system loads (circuit breaker or automatic transfer switches) to a system based on individual loads, instead of a block of individual loads. Each load is compared to the reserve capacity of the source and the load's KW value is evaluated to see if it will fit within the capacity, and if so it is added to the bus.

Bus Overload Load Shed—If the bus becomes overloaded, loads will be step or block shed depending on the severity of the overload condition to avoid loss of power to critical loads.

Load Demand—Load demand functions to reduce the number of online generator sets if reserve capacity allows for a reduced number to still power all loads requiring generator power. Generally the system is designed to allow the minimum number of generators to support the load to increase fuel and generator efficiency. Generators will be added or removed from the bus depending on system load.

Load Control (Circuit Breakers or Automatic Transfer Switches (ATS))—The system controls the adding or removing of system loads to the system automatically based up loading schemes such as block load control, bus optimization, bus under frequency load shed, and bus overload load shed.

Load HOA—Individual loads in the system may be manually added or removed from emergency (backup generator) power. This is a manual operation by the operator. There are 3 positions, HAND—which means add, OFF—which means shed the load, and AUTO which means let the system automation decide whether to power the load or not.

No Load System Test—Generator can be automatically run and connected in parallel. No system load is connected. This is for system testing purposes.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A bus and load control system, the system comprising:
A. a first bus system for providing power to a first plurality of loads, the first bus system comprising:
  a first engine generator for providing emergency power to a first bus;
  a first isolation device operatively connecting the first engine generator to the first bus; and
  a first plurality of loads coupled to the first bus; and
B. a second bus system for providing power to a second plurality of loads, the second bus system comprising:
  a first engine generator for providing emergency power to a second bus;
  a first isolation device operatively connecting the first engine generator to the second bus;
C. a third isolation device connecting the first bus system to the second bus system, and
D. a system controller for monitoring and controlling operation of the first and the second bus systems,
the system controller performing the steps of:
  receiving information from the first bus system;
  injecting the first bus information into a core code;
  running the first bus information through the core code;
  receiving information from the second bus system;
  injecting second bus information into the core code;
  running the second bus information through the core code;
  increasing an index value;
  running a program loop;
  taking the first bus information and the second bus information from the core code and organizing this information into an array;
  wherein the system controller determines whether to change an operating parameter of the system based on the first bus information and the second bus information.

2. The bus and load control system of claim 1, wherein the system controller performs the additional step of
determining if a third bus system is connected to either the first bus system or the second bus system.

3. The bus and load control system of claim 1, further comprising
a second engine generator for providing emergency power to the first bus; and
a second isolation device operatively connecting the second engine generator to the first bus;
wherein the first and second engine generators are capable of being coupled in parallel to the first bus.

4. The bus and load control system of claim 1, further comprising
a second engine generator for providing emergency power to the second bus; and
a second isolation device operatively connecting the second engine generator to the second bus;
wherein the first and second engine generators are capable of being coupled in parallel to the second bus.

5. The bus and load control system of claim 1, wherein the first isolation device comprises a circuit breaker.

6. The bus and load control system of claim 1, wherein the first isolation device comprises a automatic transfer switch.

7. The bus and load control system of claim 6, wherein the automatic transfer switch comprise an automatic transfer switch controller,
the automatic transfer switch controller in communication with a communication interface of the system controller.

8. The bus and load control system of claim 1, wherein the system controller determines to change the operating parameter of the system,
such that the system controller performs a loading function of the power system by adding at least one load to the first bus.

9. The bus and load control system of claim 8 wherein the system controller performs the loading function by issuing a permissive signal.

10. The bus and load control system of claim 9, wherein the at least one load added to the first bus is accompanied by a time delay after the permissive signal is issued.

11. The bus and load control system of claim 1, wherein the system controller performs a block loading function by adding a plurality of loads to the first bus by issuing a permissive signal.

12. The bus and load control of claim 1, wherein the system controller further performs the steps of
prioritizing the loads on the first bus;
determining at least one lower priority load on the first bus,
determining at least one higher priority load on the first bus, and
issuing a command to connect the at least one lower priority load where the at least one higher priority load does not require backup power.

13. The bus and load control of claim 1, wherein the system controller further performs the steps of:
determining whether an under frequency condition exists on the first bus; and
shedding at least one load from the first bus.

14. The bus and load system controller of claim 1, wherein the system controller comprises:
a communication interface configured to interface with a communication interface of a first interrupt device, wherein the first transfer switch-controller is a controller for a given transfer switch;
a memory configured to store program instructions; and
a processor, wherein the processor is capable of executing the program instructions to
(i) receive from the first transfer-switch controller transfer-switch data related to the first transfer-switch controller, and (ii) (ii) store the received transfer-switch data in the memory;
wherein the communication interface is capable of being removed from the communication interface of the first transfer-switch controller and thereafter interfacing with a communication interface of a second transfer-switch controller, wherein the second given transfer-switch controller is a replacement controller for the given transfer switch.

\* \* \* \* \*